US011861954B2

(12) United States Patent
Jurmo et al.

(10) Patent No.: US 11,861,954 B2
(45) Date of Patent: Jan. 2, 2024

(54) VEHICLE DIAGNOSTIC SYSTEM AND METHOD

(71) Applicant: Opus IVS, Inc., Ann Arbor, MI (US)

(72) Inventors: Michael D. Jurmo, Canton, MI (US); Robert P. Russell, Ann Arbor, MI (US); Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 0 days.

(21) Appl. No.: 16/552,568

(22) Filed: Aug. 27, 2019

(65) Prior Publication Data

US 2021/0065472 A1 Mar. 4, 2021

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01); *G07C 5/085* (2013.01)

(58) Field of Classification Search
CPC ...... G07C 5/0808; G07C 5/008; G07C 5/085; G07C 2205/02
See application file for complete search history.

(56) References Cited

U.S. PATENT DOCUMENTS 6,154,658 A 11/2000 Caci
6,728,603 B2 4/2004 Pruzan et al.
6,879,894 B1 4/2005 Lightner et al.
6,956,501 B2 10/2005 Kitson
7,092,803 B2 8/2006 Kapolka et al.
7,373,226 B1 5/2008 Cancilla et al.
(Continued)

FOREIGN PATENT DOCUMENTS

WO 2004092857 A2 10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.
(Continued)

*Primary Examiner* — James J Lee
*Assistant Examiner* — Alexander George Matta
(74) *Attorney, Agent, or Firm* — Gardner, Linn, Burkhart & Ondersma LLP

(57) ABSTRACT

A vehicle diagnostic system and method includes connecting a vehicle interface device to a diagnostic port of a vehicle to be in communication with an electrical system of the vehicle for diagnosing the vehicle, and running a selected one of multiple available diagnostic application scan programs via the vehicle interface device to generate a scan log file of the electrical system of the vehicle, where the scan log file is generated in one of a plurality of possible native file formats depending on the selected diagnostic application program. A diagnostic evaluation tool program extracts diagnostic data from the scan log file, where the diagnostic evaluation tool program is configured to extract diagnostic data from scan log files in each of the plurality of possible native file formats, and outputs the diagnostic data to a scan database in a common format from which detailed diagnostic reports are generated.

20 Claims, 6 Drawing Sheets

(56) References Cited

U.S. PATENT DOCUMENTS

| | | | |
|---|---|---|---|
| 7,502,672 B1 | 3/2009 | Kolls | |
| 7,519,458 B2 | 4/2009 | Buckley | |
| 7,532,962 B1 | 5/2009 | Lowrey et al. | |
| 7,584,030 B1 | 9/2009 | Graham | |
| 7,786,851 B2 | 8/2010 | Drew et al. | |
| 7,840,812 B1 | 11/2010 | Levenberg | |
| 7,928,837 B2 | 4/2011 | Drew et al. | |
| 8,190,322 B2 | 5/2012 | Lin et al. | |
| 8,259,936 B2 | 9/2012 | Mahalingaiah | |
| 8,306,687 B2 | 11/2012 | Chen | |
| 8,339,254 B2 | 12/2012 | Drew et al. | |
| 8,352,577 B2 | 1/2013 | Martone | |
| 8,638,207 B2 | 1/2014 | Drew et al. | |
| 8,688,313 B2 | 4/2014 | Margol et al. | |
| 8,909,416 B2 | 12/2014 | Chen et al. | |
| 9,430,884 B2 | 8/2016 | Drew et al. | |
| 9,530,255 B2 | 12/2016 | Drew et al. | |
| 9,563,988 B2 | 2/2017 | Drew et al. | |
| 9,646,130 B2 | 5/2017 | Drew et al. | |
| 10,013,816 B2 | 7/2018 | Nassar et al. | |
| 10,146,521 B2 | 12/2018 | West et al. | |
| 10,181,225 B2 | 1/2019 | Liebl et al. | |
| 10,282,924 B2 | 5/2019 | Drew et al. | |
| 10,414,277 B1 | 9/2019 | Herron et al. | |
| 10,445,953 B1 | 10/2019 | Herron et al. | |
| 10,706,645 B1 | 7/2020 | Herron et al. | |
| 10,719,813 B1 | 7/2020 | Beckmann et al. | |
| 10,748,356 B1 | 8/2020 | Herron et al. | |
| 11,062,534 B2 | 7/2021 | Jingle et al. | |
| 2001/0056544 A1 | 12/2001 | Walker | |
| 2003/0001720 A1 | 1/2003 | Wade et al. | |
| 2003/0020759 A1 | 1/2003 | Cancilla et al. | |
| 2004/0044454 A1 | 3/2004 | Ross et al. | |
| 2004/0167689 A1 | 8/2004 | Bromley et al. | |
| 2005/0021294 A1 | 1/2005 | Trsar et al. | |
| 2005/0038581 A1 | 2/2005 | Kapolka et al. | |
| 2005/0060070 A1 | 3/2005 | Kapolka et al. | |
| 2005/0182537 A1 | 8/2005 | Tefft et al. | |
| 2005/0240555 A1 | 10/2005 | Wilde et al. | |
| 2005/0251304 A1 | 11/2005 | Cancellara et al. | |
| 2006/0052921 A1 | 3/2006 | Bodin et al. | |
| 2006/0106508 A1 | 5/2006 | Liebl et al. | |
| 2006/0211446 A1 | 9/2006 | Wittmann et al. | |
| 2006/0243788 A1* | 11/2006 | Waco | G06Q 30/02 235/375 |
| 2007/0005201 A1 | 1/2007 | Chenn | |
| 2007/0043488 A1 | 2/2007 | Avery et al. | |
| 2007/0050105 A1 | 3/2007 | Chinnadurai et al. | |
| 2007/0055420 A1 | 3/2007 | Krzystofczyk et al. | |
| 2007/0073460 A1 | 3/2007 | Bertosa et al. | |
| 2007/0185624 A1 | 8/2007 | Duddles et al. | |
| 2007/0204215 A1* | 8/2007 | Mueller | G06F 30/00 715/205 |
| 2007/0233340 A1 | 10/2007 | Raichle et al. | |
| 2008/0177438 A1 | 7/2008 | Chen et al. | |
| 2008/0269975 A1 | 10/2008 | Bertosa | |
| 2008/0280602 A1 | 11/2008 | Ban | |
| 2008/0306645 A1* | 12/2008 | Dewhurst | G07C 5/008 701/31.4 |
| 2009/0006476 A1* | 1/2009 | Andreasen | G07C 5/0808 |
| 2009/0062978 A1 | 3/2009 | Picard | |
| 2009/0118899 A1 | 5/2009 | Carlson | |
| 2009/0119657 A1 | 5/2009 | Link, II | |
| 2009/0187976 A1 | 7/2009 | Perroud et al. | |
| 2009/0265055 A1 | 10/2009 | Gillies | |
| 2009/0276115 A1 | 11/2009 | Chen | |
| 2010/0042287 A1 | 2/2010 | Zhang | |
| 2010/0174446 A1 | 7/2010 | Andreasen et al. | |
| 2010/0204878 A1 | 8/2010 | Drew et al. | |
| 2010/0205450 A1* | 8/2010 | Sarnacke | B60R 25/00 713/185 |
| 2010/0262335 A1 | 10/2010 | Brozovich | |
| 2011/0071709 A1 | 3/2011 | Damiani et al. | |
| 2011/0112718 A1 | 5/2011 | Claus et al. | |
| 2011/0153150 A1 | 6/2011 | Drew et al. | |
| 2011/0276218 A1 | 11/2011 | Dwan | |
| 2011/0313593 A1 | 12/2011 | Cohen et al. | |
| 2012/0046826 A1 | 2/2012 | Panko | |
| 2012/0254345 A1 | 10/2012 | Montoya | |
| 2013/0304306 A1* | 11/2013 | Selkirk | G07C 5/0808 701/31.4 |
| 2014/0279230 A1* | 9/2014 | Bertosa | G06Q 30/0613 705/26.41 |
| 2015/0121275 A1* | 4/2015 | Marshall | G07C 5/0808 715/771 |
| 2017/0301154 A1 | 10/2017 | Rozint | |
| 2019/0258727 A1* | 8/2019 | Schmotzer | G06F 40/205 |
| 2019/0311558 A1* | 10/2019 | Bika | G07C 5/0841 |

OTHER PUBLICATIONS

Thesis by Alexander Ellery, entitled, "Systems Design & Control of a Freeflying Space Robotic Manipulation System (ATLAS) for In-Orbit Satellite Servicing Operations", Published 1996, Cranfield University, College of Aeronautics.

* cited by examiner

VEHICLE DIAGNOSTIC SYSTEM AND METHOD

BACKGROUND OF THE INVENTION

The present invention is directed to a vehicle diagnostic system and method, and in particular a system and method for obtaining and reporting selected vehicle diagnostic data information from a diagnostic evaluation for various vehicle manufacturers.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an after-market diagnostic company. The diagnostic software scanning programs are used to diagnose the electronic system of a vehicle and result in a scan log file that includes information of faults in the system. The returned scan log files from the diagnostic software scanning program are in differing native file formats and include different content and arrangements depending on the supplier of the diagnostic software scanning program, as well as the vehicle application for which the scanning program is used.

SUMMARY OF THE INVENTION

The present invention provides a vehicle diagnostic system and method that operates to systematically reads diagnostic application scan log files regardless of the native file format and transfer selected diagnostic data information from the scan log file into a scan database from which reports regarding vehicle diagnostic evaluations may be readily run, where the diagnostic data provided to the scan database may be compiled into a common format.

According to an aspect of the present invention, a method of diagnosing a vehicle includes connecting a vehicle interface device to a diagnostic port of a vehicle to be in communication with an electrical system of the vehicle for diagnosing the vehicle, and running a selected one of multiple available diagnostic application scan programs via the vehicle interface device to generate a scan log file of the electrical system of the vehicle, where the scan log file is generated in one of a plurality of possible native file formats depending on the selected diagnostic application program. The method further includes using a diagnostic evaluation tool program to extract diagnostic data from the scan log file, where the diagnostic evaluation tool program is configured to extract diagnostic data from scan log files in each of the plurality of possible native file formats.

The diagnostic evaluation tool program operates to extract diagnostic data from the scan log file comprises by translating the native file format of the scan log file and parsing the scan log file to secure selected information. In particular embodiments the selected information may comprise a Diagnostic Trouble Code ("DTC"), a description of the DTC, and the native file formats may comprise text in portable document format ("PDF"), PDF images, and Hypertext Markup Language ("HTML"), where the diagnostic evaluation tool program may translate the native file format into HTML.

The method in further embodiments additionally comprises outputting and saving the diagnostic data to a scan database, as well as generating a diagnostic detail report from the diagnostic data using the scan database. Still further, the extracted diagnostic data may be transmitted to a remote computer.

According to a further aspect of the present invention, a vehicle diagnostic system includes a computer device having multiple diagnostic application scan programs that are configured for selective use with vehicles to perform a scan of electronic systems of the vehicles using a vehicle interface device interfacing with the computer device and the vehicle. Each diagnostic application scan program is configured for use with particular vehicles and return scan log files that are provided in different native file formats depending on the selected diagnostic application scan program used for a given vehicle. The vehicle diagnostic system further includes a diagnostic evaluation tool program configured for extracting diagnostic data from each scan log file regardless of the native file format of the scan log files, with the diagnostic evaluation tool program storing the extracted diagnostic data to a scan database.

The vehicle diagnostic system and method enables diagnostic detail reports to be readily produced that include particular relevant information, where the reports may be generated regardless of the disparate data in disparate formats from scan log files. This enables users of the systems, such as repair facility operators, to quickly and efficiently provide relevant information to their customers, such as reports indicating diagnostic faults in the electrical system of the vehicle and recommended courses for repair. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
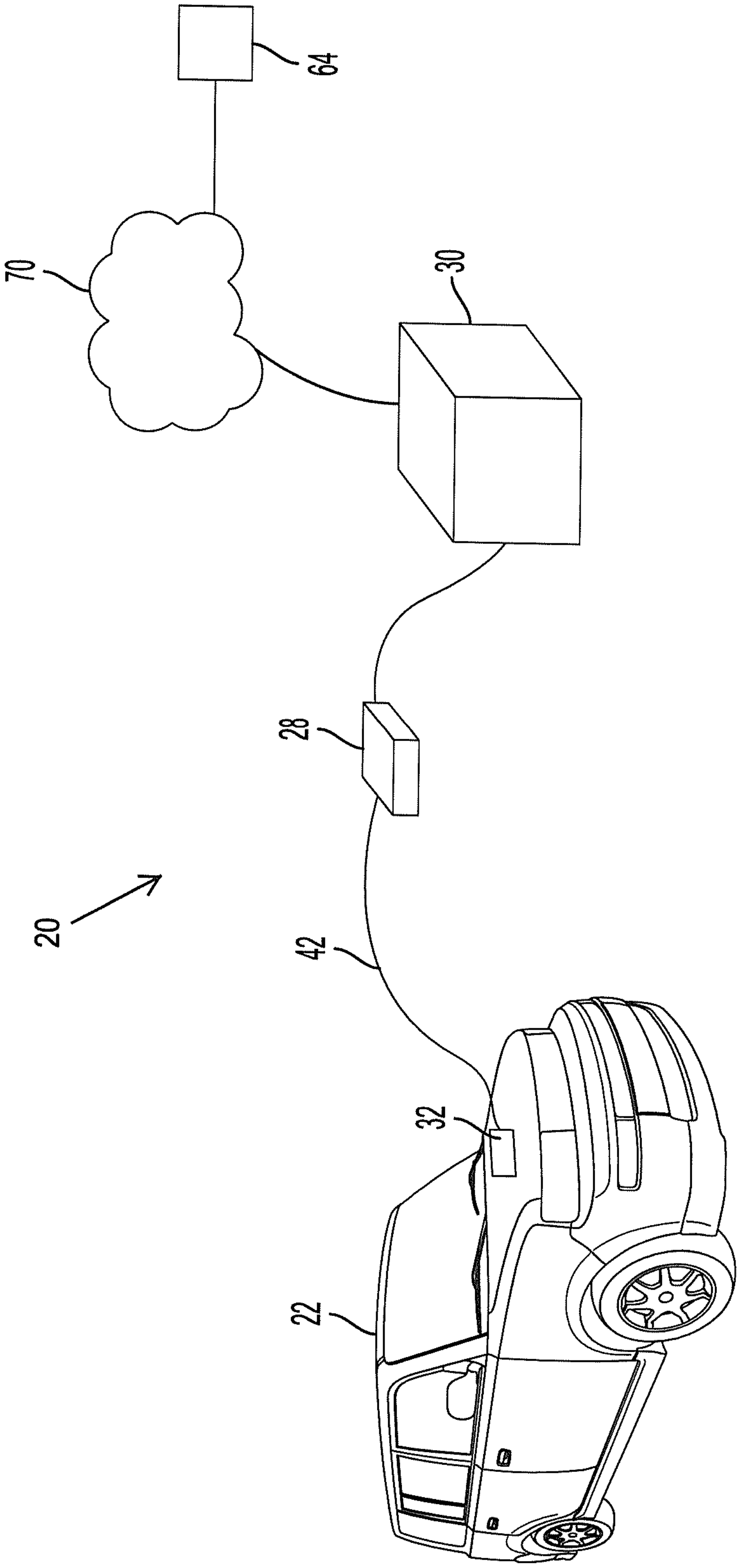
FIG. 1 is a schematic illustration of a vehicle diagnostic system in accordance with the present invention in use with a vehicle.
Figure 2:
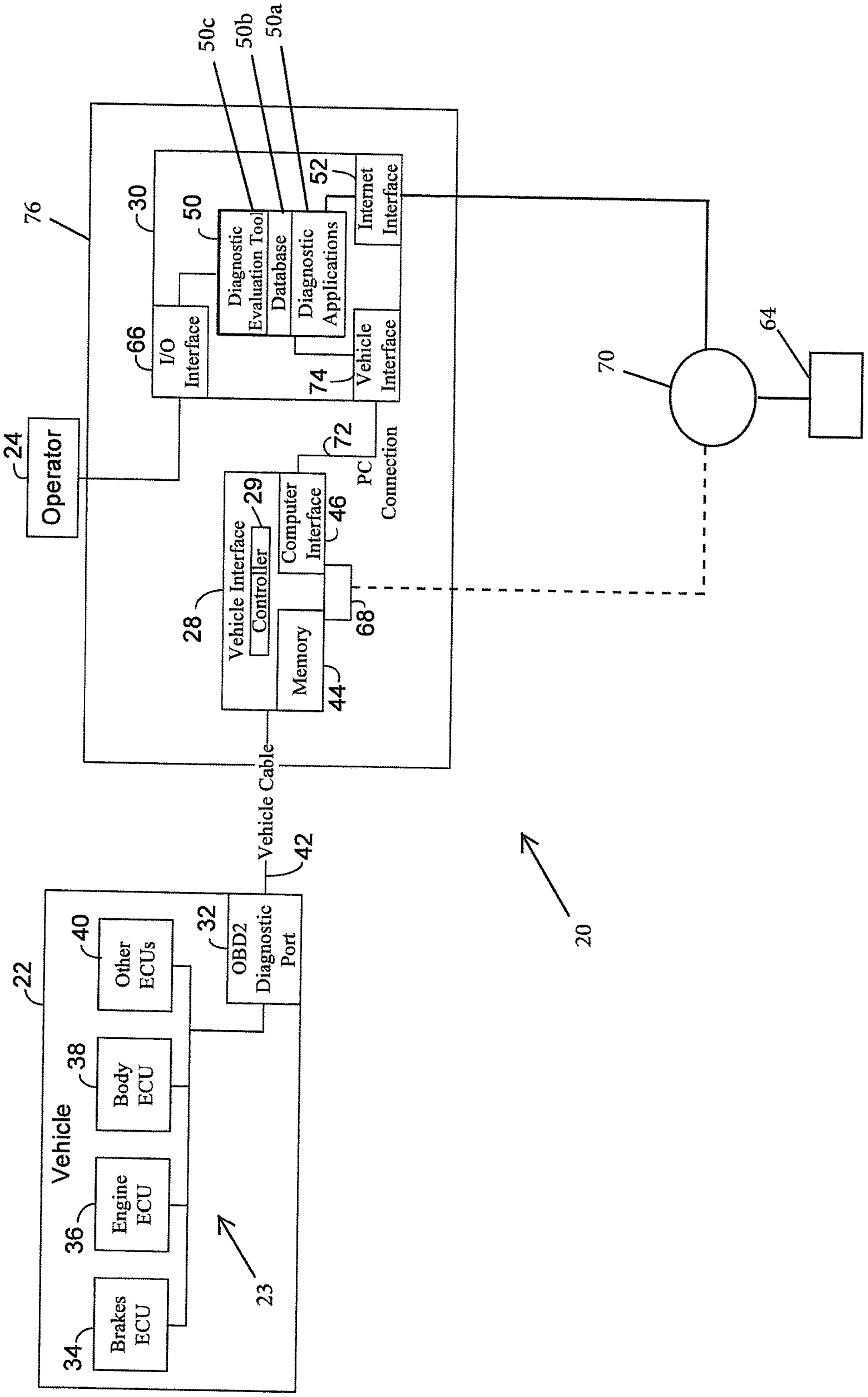
FIG. 2 is a detailed block diagram of the vehicle diagnostic system of FIG. 1.

With reference to FIGS. 1 and 2, a vehicle diagnostic system 20 for use with a vehicle 22 is shown for use by a mechanic or operator 24, such as in an automotive repair facility. System 20 is illustrated as including a vehicle diagnostic tool, referred to as a vehicle interface device or interface tool 28 that is communicatively coupled to a local computer 30. In use, vehicle interface device 28 is connected with vehicle 22 by operator 24, such as by connecting to an on-board diagnostic ("OBD") diagnostic port 32 of the vehicle 22 in order to diagnose the electronic system 23 of vehicle 22, including to diagnose various vehicle electronic control units (ECUs), such as an engine ECU 34, body ECU 36, brakes ECU 38, and/or other ECUs 40, and/or other electronic parts and components of vehicle 22. Vehicle interface device 28 connects with port 32, such as via vehicle cable 42. Vehicle interface device 28 includes a controller 29, such as in the form of a processor or microprocessor and interface circuitry to facilitate communication between the ECUs and the interface tool 28, with interface tool 28 including a database of vehicle protocols found in a local memory 44 that allow communication with the ECUs of various makes and models of vehicles. Vehicle interface device 28 additionally includes a computer interface 46 for connection with computer 30, such as via standard interfaces 74, such as USB, Bluetooth, Wi-Fi, or the like. As understood from FIGS. 1 and 2, one or both of vehicle interface device 28 and local computer 30 may be connected to a remote computer, such as a server 64, such as by an Internet 70 connection. Vehicle diagnostic system 20 may be configured to be selectively operable in one of a plurality of different modes, whereby a technician may use the interface device 28 for vehicle maintenance, diagnosis, programming and repair as needed.

Figure 3:
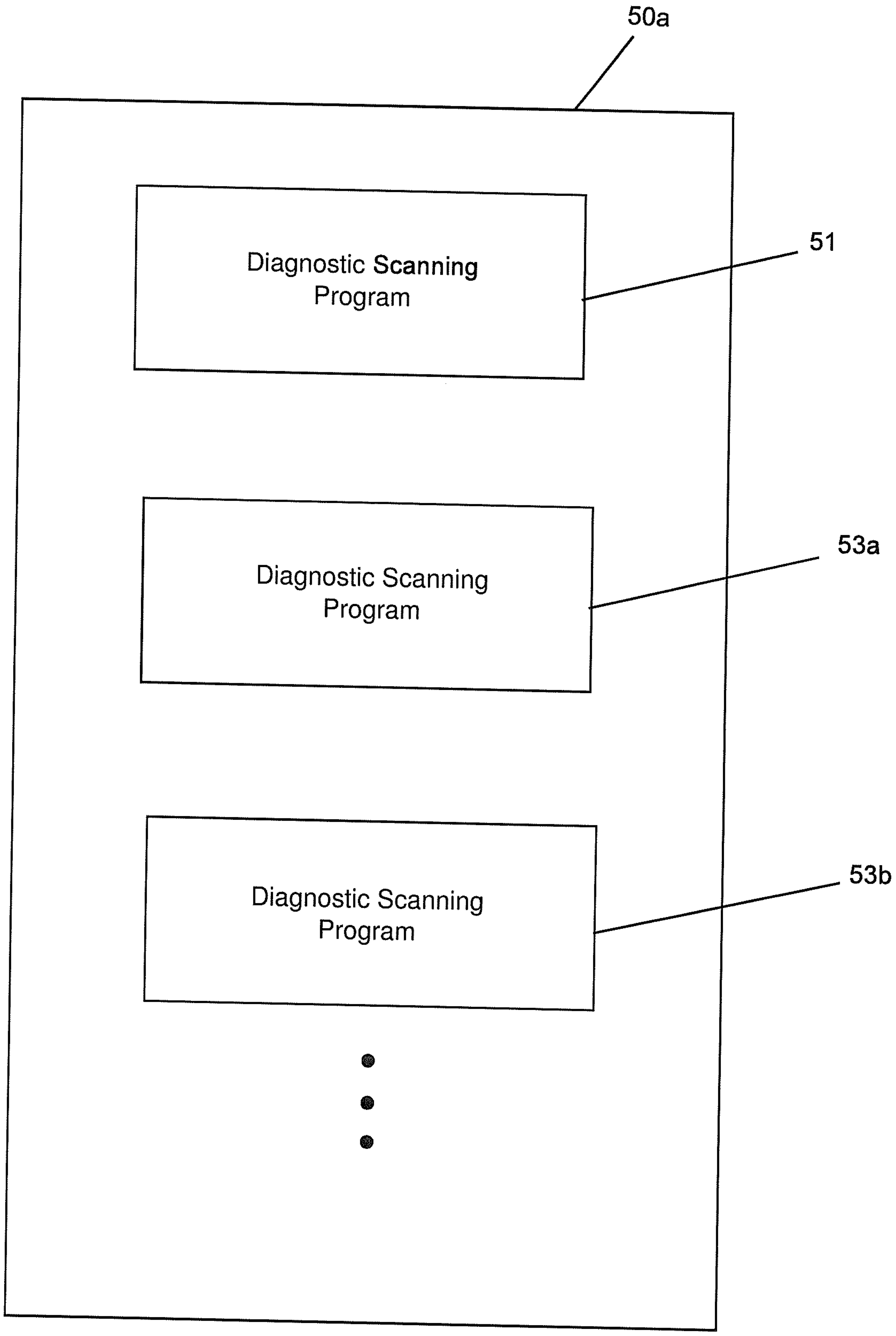
FIG. 3 is a block diagram of diagnostic applications of the vehicle diagnostic system of FIG. 2.
Figure 4:
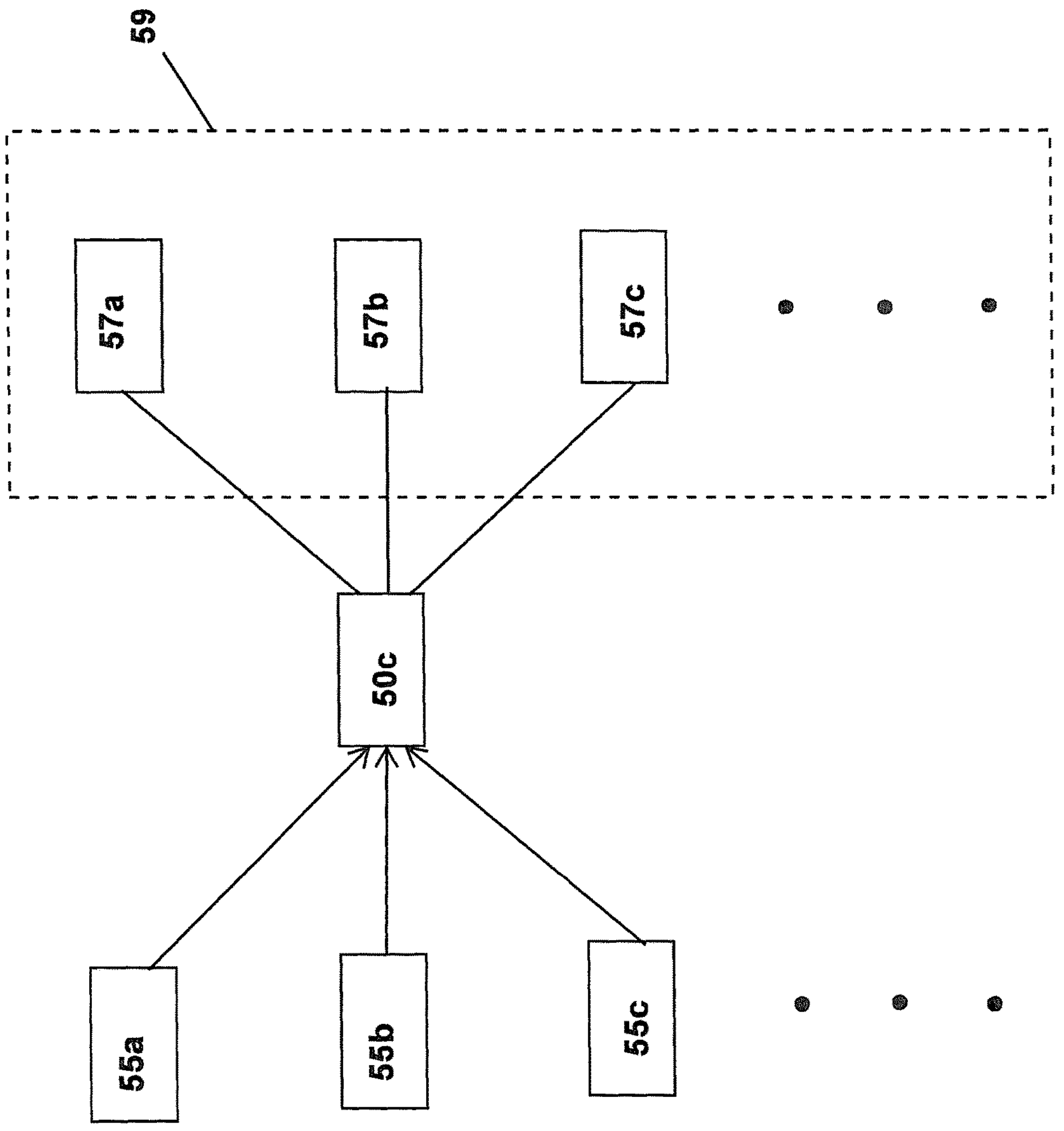
FIG. 4 is a schematic illustration of the use of a diagnostic evaluation tool with scan log files in accordance with the present invention.
Figure 5:
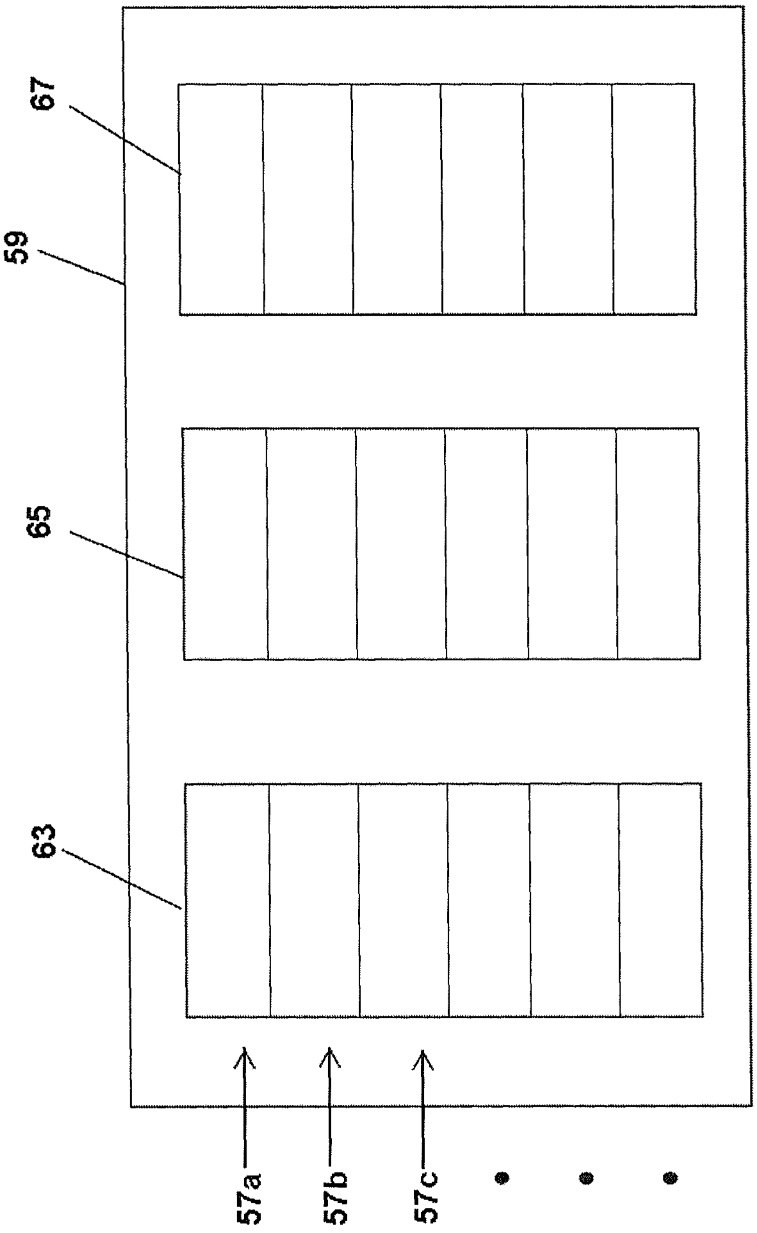
FIG. 5 is a block diagram of a database storing diagnostic data obtained from the use of a diagnostic evaluation tool in accordance with the present invention.
Figure 6:
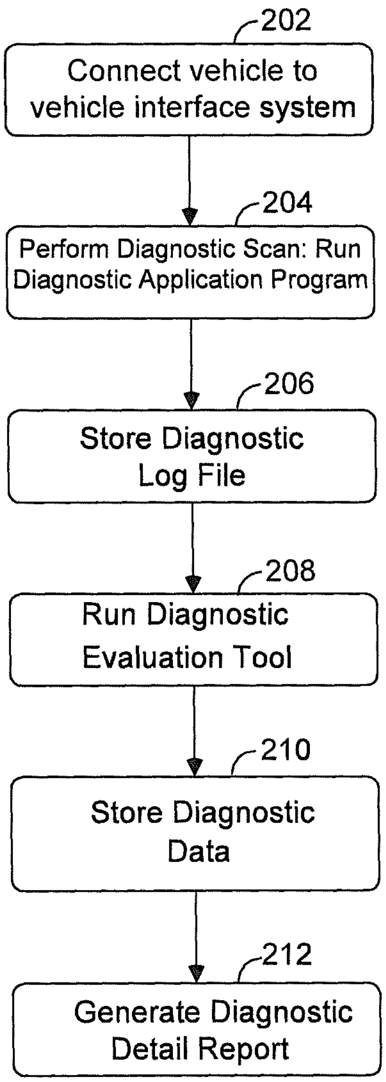
FIG. 6 is a flow diagram of a method for generating a diagnostic detail report in accordance with the present invention.

In accordance with an embodiment of the present invention, system 20 includes diagnostic applications or diagnostic application scanning tools 50*a* for scanning the electronic system 23 of vehicle 22 with a diagnostic application scanning program, such as one or more different diagnostic application scanning programs 53*a*, 53*b*, 53*c* (FIG. 3) stored in memory 50 of local computer 30, where a given scanning program is run depending on, for example, the make and model of vehicle. Scans performed by or with the diagnostic application programs 53*a*, 53*b*, 53*c* result in the generation and acquisition of data reports or scan log files for each tested vehicle, such as scan log files 55*a*, 55*b*, 55*c* (FIG. 4), that may also be stored in memory 50 of local computer 30. The diagnostic application programs 53*a*, 53*b*, 53*c* may be provided from different entities, including for example different original equipment manufacturers (OEMs), with the log files 55*a*, 55*b*, 55*c* generated by system 20 differing based on the particular vehicle under test, as well as the diagnostic application program used, including with regard to file format and/or content. System 20 thus additionally includes a diagnostic evaluation tool 50*c* that is operable to process the scan log files regardless of file format to obtain selected diagnostic data, such as diagnostic data 57*a*, 57*b*, 57*c* (FIG. 4), from each scan log file and output the diagnostic data in a uniform format to a scan database 59 (FIGS. 4 and 5) from which a user is able to generate a detail diagnostic report 61 (FIG. 6). The diagnostic report thus comprises selected information from each of the scan log files whereby the information is readily consolidated in a common format and file type. Still further, diagnostic evaluation tool 50*c* may be used to transmit the diagnostic detail reports such as via an Internet for remote review and use.

In the illustrated embodiment computer 30 is operatively connected with vehicle interface device 28, with computer 30 including one or more commercially available diagnostic application scanning programs 53*a*, 53*b*, 53*c* (FIG. 3), where the scanning programs may be configured for use with different variations of vehicles, such as by make, model, model year and/or vehicle systems or options. Accordingly, a particular diagnostic application scanning program 53*a*, 53*b*, 53*c* will be selected for use depending on the specific vehicle 22 being diagnosed. Although shown as only including three diagnostic application programs 53*a*, 53*b*, 53*c*, it should be appreciated that system 20 may include fewer than three or more than three such programs that are available for use with various vehicles. For example, a general service repair facility may service vehicles manufactured by a wide range of OEMs, including a wide range of models and model years of vehicles, and thus utilize numerous diagnostic application programs. Interface device 28 may be configured as an SAE standard J2534 device, such as a device compliant with the J2534-2 standard, or as an ISO compliant or other standard compliant device for supporting and enabling communication with the electronic systems 23 of a vehicle 22.

As illustrated in FIG. 2, the diagnostic application scanning programs 53*a*, 53*b*, 53*c* are stored in a memory 50, where the diagnostic application scanning tool is configured to enable the reading and reporting of fault codes in the electronic system of the vehicle such as may be located in ECUs of the vehicle. An exemplary diagnostic application scanning program comprises a program provided by an automotive OEM, such as General Motors ("GM"), Ford, FCA ("Fiat Chrysler Automobiles" or "Chrysler"), Bayerische Motoren Werke ("BMW"), Honda, Nissan, Toyota, Mercedes or the like. Alternatively, a diagnostic application scanning program may be provided by a company that supplies diagnostic application programs, such as Snap-On Incorporated. In practice, as noted, memory 50 may include multiple diagnostic application programs, each for use with various makes and/or models of vehicles to enable diagnosing and programming of ECUs via vehicle interface device 28, including depending on the particular vehicle systems/ECUs on the vehicle installed by the OEM based on the customer's selection of vehicle options. Vehicle interface device 28 and computer 30 are thus cooperatively used for querying/scanning and diagnosing ECUs of vehicle 22, including for accessing error codes generated by the ECUs for assessing and diagnosing operational and performance related aspects of the vehicle 22.

It should be appreciated that diagnostic application scanning programs 53*a*, 53*b*, 53*c* are provided in various computer software formats, configurations and/or languages, including for example, depending on the supplier of the diagnostic application scanning program, such as depending on the OEM. As is known by those skilled in the art, each OEM provides their own unique scanning programs. For example, the below table identifies selected OEMs and their associated scanning software program applications:

| OEM | OEM Software Application |
|---|---|
| BMW | ISTA |
| Chrysler | Witech 2.0 |
| Ford | IDS/FRDS |
| GM | GDS 2/Tech2Win |
| Honda | HDS/iHDS |
| Hyundai | GDS/KDS |
| Nissan | Consult 3+ |
| Toyota | Techstream |

Upon running a given diagnostic scanning application program 53*a*, 53*b*, 53*c* via vehicle interface 28, vehicle interface 28 returns a scan log file 55*a*, 55*b*, 55*c* reporting the status of the electronic system 23 of vehicle 22, with the associated scan log file 55*a*, 55*b*, 55*c* being stored in memory 50. Although shown to include three scan log files 55*a*, 55*b*, 55*c*, it should be appreciated that a separate scan log file will exist for each vehicle that has been diagnosed via system 20. Moreover, corresponding to the differences in the various computer software formats for the diagnostic scanning application program 53*a*, 53*b*, 53*c* depending on the diagnosed vehicle, the returned scan log files 55*a*, 55*b*, 55*c* are correspondingly provided in various native file formats depending on the diagnostic scanning application program 53*a*, 53*b*, 53*c* used to perform the diagnostic scan of the vehicle 22. These scan log native file formats include, for example, text in portable document format ("PDF"), PDF images, and Hypertext Markup Language ("HTML"), as well as may be provided or stored in various formats, including as a compressed file, such as a PKzip or ZIP file.

It should be appreciated that in a repair facility numerous scan procedures may be performed, including across a wide variety of vehicles based on make, model and/or model year. Difficulties therefor occur in accessing and processing the information provided by the scan log files due to their differing file formats and content. Accordingly, as illustrated and understood from FIG. 4, system 20 utilizes diagnostic evaluation tool 50*c* on the collected scan log files, such as files 55*a*, 55*b*, 55*c*, to extract and provide relevant desired diagnostic data 57*a*, 57*b*, 57*c* to a scan database 59 in a common format. In particular, diagnostic evaluation tool 50*c* systematically reads the scan log files, or skims the results off a screen view, and places selected diagnostic data 57*a*, 57*b*, 57*c* in the form of text into scan database 59. Although shown as having obtained and generated diagnostic data 57*a*, 57*b*, 57*c*, it should be appreciated that system 20 may obtain and generate diagnostic data for each scan log file obtained via diagnostic evaluation tool 50*c*, with the diagnostic data being stored in the scan database 59. From scan database 59, one or more detail diagnostic reports 61 may be generated, such as to evaluate diagnostic reports for a selected make of vehicle, or make and model of vehicle, or based on vehicle features, or over a selected time period.

In a particular embodiment, detail diagnostic reports 61 may be generated for individual customer vehicles at a repair facility. In this way, a common report format may be readily generated for use by a mechanic 24 when diagnosing and presenting information to the customer regarding their vehicle, with the report automatically including diagnostic data information from the scan log file without the mechanic 24 or another individual having to manually review the scan log file and enter information into a report for the customer. In particular, the detail diagnostic report 61 is created regardless of make and model of vehicle, and specifically regardless of the diagnostic scanning application program 53*a*, 53*b*, 53*c* used to scan the customer's vehicle, and correspondingly regardless of the native file format of the scan log file 55*a*, 55*b*, 55*c* returned from the diagnostic scanning application program.

Diagnostic evaluation tool 50*c* may be further or alternatively used to transmit or upload the diagnostic data 57*a*, 57*b*, 57*c* to a cloud portal, such as at 64, whereat a database of the diagnostic data may be retained.

In the illustrated embodiment, diagnostic evaluation tool 50*c* comprises an application program operating within local computer 30. In use, diagnostic evaluation tool 50*c* operates to open and read the scan log files obtained by system 20, such as files 55*a*, 55*b*, 55*c*, with tool 50*c* operatively automatically detecting or recognizing the native format of the scan log files. This may include, for example, tool 50*c* detecting or triggering based on output files or content obtained from running of a given diagnostic scanning application program 53*a*, 53*b*, 53*c*. Diagnostic evaluation tool 50*c* additionally reads and translates the scan log file data into a desired format, where necessary. In the illustrated embodiment, for example, diagnostic evaluation tool 50*c* translates the scan log file information into HTML format. Various .NET modules may be used for translating and parsing of the scan log files. For example, PDF image files may be translated and parsed using IronOcr software supplied by Iron Software LLC of Chicago, Illinois, such as IronOCR v4.4.0; PDF text files may be translated and parsed using iText software supplied by iText Group nv of Belgium, such as iText7 v7.1.2; and HTML native files may be parsed using Html Agility Pack ("HAP") provided by ZZZ Projects. It should be appreciated that alternative programs may be employed for opening, reading, translating and/or parsing the scan log files, and should be further appreciated that a diagnostic evaluation tool in accordance with the present invention may comprise multiple modules cooperatively working together. Still further, and as noted above, diagnostic evaluation tool 50*c* may alternatively be employed to extract or pull desired diagnostic data information by way of skimming selected data from a screen view of the scan log file.

As noted, diagnostic evaluation tool 50*c* extracts or pulls selected information from scan log files 55*a*, 55*b*, 55*c* for placement in scan database 59. For each of the scan log files in the illustrated embodiment, as understood from FIG. 6, diagnostic evaluation tool 50*c* pulls from the scan log file the Diagnostic Trouble Code ("DTC") 63 for a given fault, the description 65 of the fault, and the fault state 67, with that information then stored in a common format within scan database 59. As understood by a person of skill in the art, the fault state 67 indicates whether the given fault is a historic fault code that occurred in the past and may have been cleared or repaired, an active fault code, or a key cycle fault code having just occurred. It should be appreciated that scan database 59 additionally includes information regarding the make and model of vehicle, the VIN and other identifying information.

Database 59 thus allows diagnostic detail reports 61 to be readily generated. For example, in a repair facility a mechanic 24 may generate a report 61 for a customer specific to the customer's vehicle providing details regarding the vehicle and incorporating information form the scan log file as stored in database 59. Additionally or alternatively, reports may be run to evaluate a given make and model, including such as over time to assess fault history.

A method of generating diagnostic detail reports 61 in accordance with aspects of the present invention as described above is disclosed with reference to FIG. 6. As there shown, in step 202 a vehicle 22 to be evaluated is communicatively coupled to a vehicle interface device 28 via a vehicle cable 42, where the interface device 28 is in turn coupled with a local computer 30. In step 204, a diagnostic scan is performed by way of a diagnostic application scan program being run, such as one of scan program 53*a*, 53*b*, 53*c* or another, to acquire vehicle data information in the form of a scan log file. As shown in step 206, the obtained scan log file in its native format is stored, such as in memory 50 of computer 30. As per step 208, the diagnostic evaluation tool 50*c* is then run on the scan log file or files where, as discussed above, diagnostic evaluation tool 50*c* opens, reads and translates the scan log file regardless of the native file format, and parses the various information to extract particular diagnostic data from the scan log file, such as the DTC 63, fault description 65, and fault status 67. At step 210 diagnostic evaluation tool 50*c* then stores the extracted diagnostic data in the scan database 59, which may reside in memory 50 of computer 30. A user, such as a mechanic 24, may then generate a diagnostic detail report 61 at step 212.

In the illustrated embodiment vehicle interface device 28 and local computer 30 are shown as separate components making up a local computer system 76, that is with local computer 30 being proximate at the repair facility such that it is proximate the vehicle 22. In an alternative arrangement, interface device 28 and computer 30 may be integrated in a single computer device, which would likewise be proximate the vehicle at the repair facility. Still further, the illustrated embodiment discloses diagnostic evaluation tool 50*c* as residing on local computer 30. It should be appreciated, however, that diagnostic evaluation tool 50*c* may reside on remote computer 64, with scan log files, such as files 55*a*, 55*b*, 55*c*, being transmitted via Internet 70 to remote computer 64 for use with diagnostic evaluation tool 50*c*. This may further include, for example, diagnostic detail reports 61 subsequently being transmitted from computer 64 to local computer 30. Remote computer 64 may also be used to operate local computer 30, and in particular to operate diagnostic scanning programs and diagnostic evaluation tool independent from actions by a local operator, such as mechanic 24.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of diagnosing a vehicle comprising:

providing a vehicle interface computer device, said vehicle interface computer device configured to operate in a mode to diagnose a vehicle;

connecting said vehicle interface computer device with a diagnostic port of a vehicle to be in communication with an electrical system of the vehicle;

running a selected one of a plurality of diagnostic application scan programs via the vehicle interface computer device to generate a scan log file of the electrical system of the vehicle, wherein the selected diagnostic application scan program is selected based at least in part on the make and model of the vehicle, and wherein the scan log file is generated in one of a plurality of possible native file formats depending on the selected diagnostic application scan program;

using a diagnostic evaluation tool program to extract a particular predefined selected portion of diagnostic data from the scan log file, wherein the diagnostic evaluation tool program is operable to extract the particular predefined selected portion of diagnostic data from scan log files in each of the plurality of possible native file formats, and wherein the extracted particular predefined selected portion of diagnostic data comprises a Diagnostic Trouble Code ("DTC"), a description of the DTC, and a fault state; and outputting and saving and retaining the particular predefined selected portion of diagnostic data to a scan database, wherein the particular predefined selected portion of diagnostic data is retained in the scan database in a common format independent of the native file format of the scan log file.

2. The method of claim 1, wherein the diagnostic evaluation tool program comprises a plurality of modules.

3. The method of claim 1, further comprising generating a diagnostic detail report from the extracted particular predefined selected portion of diagnostic data using the scan database.

4. The method of claim 1, further comprising transmitting the extracted particular predefined selected portion of diagnostic data to a remote computer.

5. The method of claim 1, wherein said providing a vehicle interface computer device further comprises providing a computer, and wherein said computer includes a plurality of diagnostic application scan programs.

6. The method of claim 5, wherein said computer is located proximate to the vehicle.

7. The method of claim 1, wherein the plurality of native file formats comprises text in portable document format ("PDF"), PDF images, and Hypertext Markup Language ("HTML").

8. The method of claim 1, wherein said using a diagnostic evaluation tool program to extract the particular predefined selected portions of diagnostic data from the scan log file comprise translating the native file format of the scan log file and parsing the scan log file.

9. The method of claim 8, wherein said translating the native file format comprises translating the native file format to HTML, wherein the common format in which the extracted particular predefined selected portion of diagnostic data is saved is HTML.

10. A vehicle diagnostic system comprising:

a computer device having a plurality of diagnostic application scan programs with the diagnostic application scan programs configured for selective use with vehicles to perform a scan of electronic systems of the vehicles using a vehicle interface device interfacing with the computer device and the vehicle, wherein each diagnostic application scan program is configured for use with particular vehicles based on the make and model of the vehicles and wherein the diagnostic application scan programs return scan log files and the scan log files are provided in different native file formats depending on the selected diagnostic application scan program used for a given vehicle;

a diagnostic evaluation tool program, the diagnostic evaluation tool program configured for extracting particular predefined selected portions of diagnostic data from each scan log file regardless of the native file format of the scan log files, wherein the particular predefined extracted selected portions of diagnostic data comprises a Diagnostic Trouble Code ("DTC"), a description of the DTC, and a fault state from each scan log file, and wherein the diagnostic evaluation tool program outputs the particular predefined extracted selected portions of diagnostic data in a common format to a scan database, and wherein the particular predefined extracted selected portions of diagnostic data are retained in the scan database.

11. The vehicle diagnostic system of claim 10, wherein said diagnostic evaluation tool program resides on a memory of said computer device.

12. The vehicle diagnostic system of claim 10, wherein said scan database resides on a memory of said computer device.

13. The vehicle diagnostic system of claim 10, wherein said computer device and said vehicle interface are located proximate to a vehicle when in use.

14. The vehicle diagnostic system of claim 10, wherein the scan log files are provided in one of text in portable document format ("PDF"), PDF images format, and Hypertext Markup Language ("HTML") format.

15. The vehicle diagnostic system of claim 14, wherein said diagnostic evaluation tool program operates to translate the native file format of each scan log file and parse each scan log file.

16. The vehicle diagnostic system of claim 15, wherein said diagnostic evaluation tool program operates to translate the native file format of each scan log file to HTML.

17. The vehicle diagnostic system of claim 10, wherein said diagnostic evaluation tool program operates to automatically detect the native file format of the scan log file.

18. The method of claim 1, wherein said using the diagnostic evaluation tool program to extract particular predefined selected portions of diagnostic data from the scan log file further comprises automatically detecting with the diagnostic evaluation tool program the native file format of the scan log file.

19. A method of diagnosing vehicles and generating diagnostic reports comprising:

providing a vehicle interface computer device, said vehicle interface computer device configured to operate in a mode to diagnose a vehicle;

selectively connecting said vehicle interface computer device with a plurality of vehicles via diagnostic ports of the vehicles so as to be in communication with an electrical system of each of the vehicles;

selecting for each vehicle a diagnostic application scan program from a plurality of diagnostic application scan programs to be used with the vehicle, wherein the selected diagnostic application scan program is selected based at least in part on the make and model of the vehicle;

generating a scan log file for each of the plurality of vehicles by running the selected diagnostic application scan program for the vehicle via the vehicle interface computer device, wherein the scan log file is generated in one of a plurality of possible native file formats depending on the selected diagnostic application program;

extracting particular predefined selected portions of diagnostic data from each of the scan log files using a diagnostic evaluation tool program, wherein the diagnostic evaluation tool program is operable to extract the particular predefined selected portions of diagnostic data from each of the scan log files in each of the plurality of possible native file formats;

outputting and saving and retaining the particular predefined selected portions of diagnostic data from each of the scan log files to a scan database, wherein the particular predefined selected portions of diagnostic data are retained in the scan database in a common format independent of the native file format of the scan log file; and generating a diagnostic detail report of at least some of the extracted particular predefined selected portions of diagnostic data contained in the scan database.

20. The method of claim 19, wherein said using the diagnostic evaluation tool program to extract particular predefined selected portions of diagnostic data from the scan log file further comprises automatically detecting with the diagnostic evaluation tool program the native file format of the scan log file.

* * * * *